（12） United States Patent
Pitt

(10) Patent No.: US 9,167,553 B2
(45) Date of Patent: *Oct. 20, 2015

(54) GEONEXUS PROXIMITY DETECTOR NETWORK

(71) Applicant: TeleCommunication Systems, Inc., Annapolis, MD (US)

(72) Inventor: Lance Douglas Pitt, Kent, WA (US)

(73) Assignee: TeleCommunication Systems, Inc., Anapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,346

(22) Filed: Nov. 20, 2013

(65) Prior Publication Data

US 2014/0080513 A1  Mar. 20, 2014

Related U.S. Application Data

(63) Continuation-in-part of application No. 13/954,379, filed on Jul. 30, 2013, which is a continuation of application No. 12/929,502, filed on Jan. 28, 2011, now Pat. No. 8,515,414, which is a continuation of (Continued)

(51) Int. Cl.
*H04W 4/00* (2009.01)
*H04W 64/00* (2009.01)
(Continued)

(52) U.S. Cl.
CPC ........... *H04W 64/003* (2013.01); *G01S 5/0009* (2013.01); *G01S 13/74* (2013.01); *H04W 4/023* (2013.01)

(58) Field of Classification Search
CPC .......... G06Q 30/0255; G06Q 30/0267; G06Q 30/0269; G06Q 10/0631; G06Q 10/0635; H04L 12/403; H04L 67/18; H04L 67/12; H04L 45/741; H04L 61/2038; H04L 63/0428; H04L 67/306; H04L 67/02; H04L 12/18; H04L 12/185; H04L 12/4633; H04L 43/08; H04L 51/32; H04W 4/02; H04W 4/023; H04W 4/22; H04W 4/046; H04W 48/04; H04W 4/001; H04W 4/206; H04W 52/0209; H04W 84/005; H04W 88/02
USPC ............. 455/456.1, 440, 42.1, 456.62, 422.1; 342/20, 57, 58
See application file for complete search history.

(56) References Cited

U.S. PATENT DOCUMENTS 4,445,118 A   4/1984   Taylor
4,928,107 A   5/1990   Kuroda (Continued)

OTHER PUBLICATIONS

B.W. Parkinson et al., Global Positioning System: Theory and Applications, vol. 1, Progress in Astronautics and Aeronautics, vol. 163, American Institute of Aeronautics and Astronautics, Inc., p. 184-187, 1996.

(Continued)

*Primary Examiner* — Nimesh Patel
(74) *Attorney, Agent, or Firm* — William H. Bollman

(57) ABSTRACT

A GeoNexus proximity network provides quick determination of proximity of a large group of associated mobile devices (e.g., 'friends', all devices associated with those who 'like' a given posting, etc.) To respond to a given proximity request, a list of identities is obtained for the group of associated mobile devices for which proximity is to be determined. A bucket index is determined of a place to which proximity is to be determined for each of the plurality of associated mobile devices. A target geonexus node associated with the determined bucket index is queried, which in turn queries geonexus nodes adjacent thereto, to quickly determine which of the group of mobile devices are proximate, without the need to individually query for location of each mobile device in the group.

14 Claims, 7 Drawing Sheets

Related U.S. Application Data application No. 11/405,579, filed on Apr. 18, 2006, now Pat. No. 7,899,450.

(60) Provisional application No. 60/777,565, filed on Mar. 1, 2006, provisional application No. 61/728,546, filed on Nov. 20, 2012.

(51) Int. Cl.
*H04W 4/02* (2009.01)
*G01S 5/00* (2006.01)
*G01S 13/74* (2006.01)

(56) References Cited

U.S. PATENT DOCUMENTS

| | | | |
|---|---|---|---|
| 4,972,484 A | 11/1990 | Theile | |
| 5,126,722 A | 6/1992 | Kamis | |
| 5,283,570 A | 2/1994 | DeLuca | |
| 5,301,354 A | 4/1994 | Schwendeman | |
| 5,311,516 A | 5/1994 | Kuznicki | |
| 5,327,529 A | 7/1994 | Fults | |
| 5,335,246 A | 8/1994 | Yokev | |
| 5,351,235 A | 9/1994 | Lahtinen | |
| 5,365,451 A | 11/1994 | Wang | |
| 5,418,537 A | 5/1995 | Bird | |
| 5,422,813 A | 6/1995 | Schuchman | |
| 5,479,408 A | 12/1995 | Will | |
| 5,485,163 A | 1/1996 | Singer | |
| 5,504,491 A | 4/1996 | Chapman | |
| 5,506,886 A | 4/1996 | Maine | |
| 5,517,199 A | 5/1996 | DiMattei | |
| 5,530,655 A | 6/1996 | Lokhoff | |
| 5,530,914 A | 6/1996 | McPheters | |
| 5,539,395 A | 7/1996 | Buss | |
| 5,539,829 A | 7/1996 | Lokhoff | |
| 5,546,445 A | 8/1996 | Dennison | |
| 5,568,153 A | 10/1996 | Beliveau | |
| 5,583,774 A | 12/1996 | Diesel | |
| 5,594,780 A | 1/1997 | Weideman | |
| 5,606,618 A | 2/1997 | Lokhoff | |
| 5,629,693 A | 5/1997 | Janky | |
| 5,633,630 A | 5/1997 | Park | |
| 5,636,276 A | 6/1997 | Brugger | |
| 5,661,652 A | 8/1997 | Sprague | |
| 5,661,755 A | 8/1997 | Van de Kerkhof | |
| 5,689,245 A | 11/1997 | Noreen | |
| 5,699,053 A | 12/1997 | Jonsson | |
| 5,704,029 A | 12/1997 | Wright, Jr. | |
| 5,721,781 A | 2/1998 | Deo | |
| 5,731,785 A | 3/1998 | Lemelson | |
| 5,765,152 A | 6/1998 | Erickson | |
| 5,771,353 A | 6/1998 | Eggleston | |
| 5,774,670 A | 6/1998 | Montulli | |
| 5,809,415 A | 9/1998 | Rossmann | |
| 5,812,086 A | 9/1998 | Bertiger | |
| 5,812,087 A | 9/1998 | Krasner | |
| 5,841,396 A | 11/1998 | Krasner | |
| 5,857,201 A | 1/1999 | Wright, Jr. | |
| 5,864,667 A | 1/1999 | Barkan | |
| 5,874,914 A | 2/1999 | Krasner | |
| 5,896,369 A | 4/1999 | Warsta | |
| 5,898,391 A | 4/1999 | Jeffries | |
| 5,922,074 A | 7/1999 | Richard | |
| 5,930,250 A | 7/1999 | Klok | |
| 5,945,944 A | 8/1999 | Krasner | |
| 5,946,629 A | 8/1999 | Sawyer | |
| 5,950,137 A | 9/1999 | Kim | |
| 5,960,362 A | 9/1999 | Grob | |
| 5,983,099 A | 11/1999 | Yao | |
| 5,999,124 A | 12/1999 | Sheynblat | |
| 6,032,051 A | 2/2000 | Hall | |
| 6,052,081 A | 4/2000 | Krasner | |
| 6,058,338 A | 5/2000 | Agashe | |
| 6,061,018 A | 5/2000 | Sheynblat | |
| 6,064,336 A | 5/2000 | Krasner | |
| 6,067,045 A | 5/2000 | Castelloe | |
| 6,081,229 A | 6/2000 | Soliman | |
| 6,085,320 A | 7/2000 | Kaliski, Jr. | |
| 6,118,403 A * | 9/2000 | Lang | 342/357.31 |
| 6,121,923 A | 9/2000 | King | |
| 6,124,810 A | 9/2000 | Segal | |
| 6,131,067 A | 10/2000 | Girerd | |
| 6,133,874 A | 10/2000 | Krasner | |
| 6,134,483 A | 10/2000 | Vayanos | |
| 6,147,598 A | 11/2000 | Murphy | |
| 6,150,980 A | 11/2000 | Krasner | |
| 6,154,172 A | 11/2000 | Piccionelli | |
| 6,169,901 B1 | 1/2001 | Boucher | |
| 6,169,902 B1 | 1/2001 | Kawamoto | |
| 6,178,506 B1 | 1/2001 | Quick, Jr. | |
| 6,185,427 B1 | 2/2001 | Krasner | |
| 6,188,354 B1 | 2/2001 | Soliman | |
| 6,188,909 B1 | 2/2001 | Alanara | |
| 6,189,098 B1 | 2/2001 | Kaliski, Jr. | |
| 6,195,557 B1 | 2/2001 | Havinis | |
| 6,204,798 B1 * | 3/2001 | Fleming, III | 342/20 |
| 6,205,330 B1 | 3/2001 | Winbladh | |
| 6,208,290 B1 | 3/2001 | Krasner | |
| 6,215,441 B1 | 4/2001 | Moeglein | |
| 6,239,742 B1 | 5/2001 | Krasner | |
| 6,247,135 B1 | 6/2001 | Feague | |
| 6,249,873 B1 | 6/2001 | Richard | |
| 6,253,203 B1 | 6/2001 | O'Flaherty | |
| 6,260,147 B1 | 7/2001 | Quick, Jr. | |
| 6,275,692 B1 | 8/2001 | Skog | |
| 6,275,849 B1 | 8/2001 | Ludwig | |
| 6,297,768 B1 | 10/2001 | Allen, Jr. | |
| 6,307,504 B1 | 10/2001 | Sheynblat | |
| 6,308,269 B2 | 10/2001 | Proidl | |
| 6,313,786 B1 | 11/2001 | Sheynblat | |
| 6,321,257 B1 | 11/2001 | Kotala | |
| 6,324,524 B1 | 11/2001 | Lent | |
| 6,327,473 B1 | 12/2001 | Soliman | |
| 6,333,919 B2 | 12/2001 | Gaffney | |
| 6,360,093 B1 | 3/2002 | Ross | |
| 6,360,102 B1 | 3/2002 | Havinis | |
| 6,363,254 B1 | 3/2002 | Jones | |
| 6,367,019 B1 | 4/2002 | Ansell | |
| 6,370,389 B1 | 4/2002 | Isomursu | |
| 6,377,209 B1 | 4/2002 | Krasner | |
| 6,400,304 B1 | 6/2002 | Chubbs | |
| 6,400,314 B1 | 6/2002 | Krasner | |
| 6,400,958 B1 | 6/2002 | Isomursu | |
| 6,411,254 B1 | 6/2002 | Moeglein | |
| 6,421,002 B2 | 7/2002 | Krasner | |
| 6,429,812 B1 | 8/2002 | Hoffberg | |
| 6,430,504 B1 | 8/2002 | Gilbert | |
| 6,433,734 B1 | 8/2002 | Krasner | |
| 6,442,391 B1 | 8/2002 | Johansson | |
| 6,449,473 B1 | 9/2002 | Raivisto | |
| 6,449,476 B1 | 9/2002 | Hutchison, IV | |
| 6,456,852 B2 | 9/2002 | Bar | |
| 6,463,272 B1 | 10/2002 | Wallace | |
| 6,477,150 B1 | 11/2002 | Maggenti | |
| 6,505,049 B1 | 1/2003 | Dorenbosch | |
| 6,510,387 B2 | 1/2003 | Fuchs | |
| 6,512,922 B1 | 1/2003 | Burg | |
| 6,512,930 B2 | 1/2003 | Sandegren | |
| 6,515,623 B2 | 2/2003 | Johnson | |
| 6,519,466 B2 | 2/2003 | Pande | |
| 6,522,682 B1 | 2/2003 | Kohli | |
| 6,525,687 B2 | 2/2003 | Roy | |
| 6,525,688 B2 | 2/2003 | Chou | |
| 6,529,829 B2 | 3/2003 | Turetzky | |
| 6,531,982 B1 | 3/2003 | White | |
| 6,538,757 B1 | 3/2003 | Sansone | |
| 6,539,200 B1 | 3/2003 | Schiff | |
| 6,539,304 B1 | 3/2003 | Chansarkar | |
| 6,542,464 B1 | 4/2003 | Takeda | |
| 6,542,734 B1 | 4/2003 | Abrol | |
| 6,542,743 B1 | 4/2003 | Soliman | |
| 6,549,776 B1 | 4/2003 | Joong | |
| 6,549,844 B1 | 4/2003 | Egberts | |

(56) References Cited

U.S. PATENT DOCUMENTS

| | | |
|---|---|---|
| 6,556,832 B1 | 4/2003 | Soliman |
| 6,560,461 B1 | 5/2003 | Fomukong |
| 6,560,534 B2 | 5/2003 | Abraham |
| 6,567,035 B1 * | 5/2003 | Elliott .............................. 342/20 |
| 6,570,530 B2 | 5/2003 | Gaal |
| 6,574,558 B2 | 6/2003 | Kohli |
| 6,580,390 B1 | 6/2003 | Hay |
| 6,584,552 B1 | 6/2003 | Kuno |
| 6,594,500 B2 | 7/2003 | Bender |
| 6,597,311 B2 | 7/2003 | Sheynblat |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockeart |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockeart |
| 6,680,695 B2 | 1/2004 | Turetzky |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | van Diggelen |
| 6,704,651 B2 | 3/2004 | Van Diggelen |
| 6,707,421 B1 | 3/2004 | Drury |
| 6,714,793 B1 | 3/2004 | Carey |
| 6,721,871 B2 | 4/2004 | Piispanen |
| 6,724,342 B2 | 4/2004 | Bloebaum |
| 6,725,159 B2 | 4/2004 | Krasner |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aguilon |
| 6,741,842 B2 | 5/2004 | Goldberg |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,772,340 B1 | 8/2004 | Peinado |
| 6,775,655 B1 | 8/2004 | Peinado |
| 6,775,802 B2 | 8/2004 | Gaal |
| 6,778,136 B2 | 8/2004 | Gronomeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McCraw |
| 6,799,050 B1 | 9/2004 | Krasner |
| 6,801,124 B2 | 10/2004 | Naitou |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,069 B1 | 11/2004 | Kogan |
| 6,829,475 B1 | 12/2004 | Lee |
| 6,832,373 B2 | 12/2004 | O'Neill |
| 6,833,785 B2 | 12/2004 | Brown |
| 6,839,020 B2 | 1/2005 | Geier |
| 6,839,021 B2 | 1/2005 | Sheynblat |
| 6,842,715 B1 | 1/2005 | Gaal |
| 6,853,849 B1 * | 2/2005 | Tognazzini ................... 455/457 |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,734 B2 | 3/2005 | Voor |
| 6,873,854 B2 | 3/2005 | Crockett |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,895,324 B2 | 5/2005 | Straub |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,956,467 B1 | 10/2005 | Mercado, Jr. |
| 6,957,073 B2 | 10/2005 | Bye |
| 6,961,562 B2 | 11/2005 | Ross |
| 6,965,754 B2 | 11/2005 | King |
| 6,965,767 B2 | 11/2005 | Maggenti |
| 6,970,917 B1 | 11/2005 | Kushwaha |
| 6,973,166 B1 | 12/2005 | Tsumpes |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohles |
| 6,985,105 B1 | 1/2006 | Pitt |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,064,656 B2 | 6/2006 | Belcher et al. |
| 7,065,351 B2 | 6/2006 | Carter |
| 7,065,507 B2 | 6/2006 | Mohammed |
| 7,071,814 B1 | 7/2006 | Schorman |
| 7,079,857 B2 | 7/2006 | Maggenti |
| 7,103,018 B1 | 9/2006 | Hasen |
| 7,103,574 B1 | 9/2006 | Peinado |
| 7,106,717 B2 | 9/2006 | Rosseau |
| 7,136,838 B1 | 11/2006 | Peinado |
| 7,151,946 B2 | 12/2006 | Maggenti |
| 7,177,623 B2 | 2/2007 | Baldwin |
| 7,209,969 B2 | 4/2007 | Lahti |
| 7,218,940 B2 | 5/2007 | Niemenna |
| 7,221,959 B2 | 5/2007 | Lindquist |
| 7,269,428 B1 | 9/2007 | Wallenius |
| 7,301,494 B2 | 11/2007 | Waters |
| 7,504,983 B2 | 3/2009 | Chen |
| 2001/0011247 A1 | 8/2001 | O'Flaherty |
| 2002/0037735 A1 | 3/2002 | Maggenti |
| 2002/0038182 A1 | 3/2002 | Wong |
| 2002/0052214 A1 | 5/2002 | Maggenti |
| 2002/0061760 A1 | 5/2002 | Maggenti |
| 2002/0069529 A1 | 6/2002 | Wieres |
| 2002/0102999 A1 | 8/2002 | Maggenti |
| 2002/0112047 A1 | 8/2002 | Kushwaha |
| 2002/0135504 A1 | 9/2002 | Singer |
| 2002/0173317 A1 | 11/2002 | Nykanen |
| 2002/0198632 A1 * | 12/2002 | Breed et al. ................... 701/1 |
| 2003/0009602 A1 | 1/2003 | Jacobs |

(56) References Cited

U.S. PATENT DOCUMENTS

| | | |
|---|---|---|
| 2003/0037163 A1 | 2/2003 | Kitada |
| 2003/0065788 A1 | 4/2003 | Salomaki |
| 2003/0078064 A1 | 4/2003 | Chan |
| 2003/0081557 A1 | 5/2003 | Mettala |
| 2003/0101329 A1 | 5/2003 | Lahti |
| 2003/0101341 A1 | 5/2003 | Kettler |
| 2003/0103484 A1 | 6/2003 | Oommen |
| 2003/0114157 A1 | 6/2003 | Spitz |
| 2003/0119528 A1 | 6/2003 | Pew |
| 2003/0151507 A1 | 8/2003 | Andre |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0204640 A1 | 10/2003 | Sahinaja |
| 2003/0223381 A1 | 12/2003 | Schroderus |
| 2004/0002326 A1 | 1/2004 | Maher |
| 2004/0044623 A1 | 3/2004 | Wake |
| 2004/0064550 A1 | 4/2004 | Sakata |
| 2004/0068724 A1 | 4/2004 | Gardner |
| 2004/0090121 A1 | 5/2004 | Simonds |
| 2004/0204806 A1 | 10/2004 | Chen |
| 2004/0205151 A1 | 10/2004 | Sprigg |
| 2004/0229632 A1 | 11/2004 | Flynn |
| 2005/0003797 A1 | 1/2005 | Baldwin |
| 2005/0028034 A1 | 2/2005 | Gantman |
| 2005/0039178 A1 | 2/2005 | Marolia |
| 2005/0041578 A1 | 2/2005 | Huotari |
| 2005/0086340 A1 | 4/2005 | Kang |
| 2005/0086467 A1 | 4/2005 | Asokan |
| 2005/0112030 A1 | 5/2005 | Gauss |
| 2005/0136895 A1 | 6/2005 | Thenthiruperai |
| 2005/0172217 A1 | 8/2005 | Leung |
| 2005/0174987 A1 | 8/2005 | Raghav |
| 2005/0209995 A1 | 9/2005 | Aksu |
| 2005/0246217 A1 | 11/2005 | Horn |
| 2005/0259675 A1 | 11/2005 | Tuohino |
| 2006/0053225 A1 | 3/2006 | Poikleska |
| 2006/0058045 A1 | 3/2006 | Nilsen |
| 2006/0074618 A1 | 4/2006 | Miller |
| 2006/0090136 A1 | 4/2006 | Miller |
| 2006/0132349 A1 | 6/2006 | Stern |
| 2006/0212558 A1 | 9/2006 | Sahinoja |
| 2006/0212562 A1 | 9/2006 | Kushwaha |
| 2006/0234639 A1 | 10/2006 | Kushwaha |
| 2006/0234698 A1 | 10/2006 | Folk |
| 2007/0026854 A1 | 2/2007 | Nath |
| 2007/0030539 A1 | 2/2007 | Nath |
| 2007/0030973 A1 | 2/2007 | Mikan |
| 2007/0042765 A1 | 2/2007 | Bailin |
| 2010/0214148 A1 | 8/2010 | Kuhn |
| 2010/0214149 A1 | 8/2010 | Kuhn |

OTHER PUBLICATIONS

M. Spreitzer et al., Providing Location Information in a Ubiquitous Computing Environment, Operating Systems Review (SIGOPS), Dec. 1993, No. 5, pp. 270-283.

U. Leonhardt et al, Toward a General Location Service for Mobile Environments, Services in a Distributed and Networked Environments, Dept. of Computing, Imperial College, IEEE, 1996, pp. 43-50.

D. Kesdogan, Secure Location Information Management in Cellular Radio Systems, Aachen University of Technology, Computer Science Department, 1995, pp. 35-40.

ETSI Technical Report, Security Techniques Advisory Group (STAG); Definition of user requirements for lawful interception of telecommunications; Requirements of Law Enforcement Agencies, Dec. 1996, ETR 331, pp. 1-22.

\* cited by examiner

FIG. 5

| CARD Identifier (table index) | Lat | Lon | Primary X | Primary Y | Secondary X | Secondary Y | Tertiary X | Tertiary Y | Quaternary X | Quaternary Y |
|---|---|---|---|---|---|---|---|---|---|---|
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

GEONEXUS PROXIMITY DETECTOR NETWORK

The present invention is a continuation-in-part of U.S. application Ser. No. 13/954,379 to Pitt et al. entitled "Transmitter Augmented Radar/Laser Detection Using Local Mobile Network Within a Wide Area Network", filed Jul. 30, 2013; which is a continuation of U.S. application Ser. No. 12/929,502 to Pitt et al. entitled "Cellular Augmented Radar/Laser Detection Using Local Mobile Network Within Cellular Network", filed Jan. 28, 2011, now U.S. Pat. No. 8,515, 414; which is a continuation of U.S. application Ser. No. 11/405,579 to Pitt et al. entitled "Cellular Augmented Radar/Laser Detection Using Local Mobile Network Within Cellular Network", filed on Apr. 18, 2006, now U.S. Pat. No. 7,899,450, which claims priority from U.S. Provisional No. 60/777,565 to Pitt et al. entitled "Cellular Augmented Radar/Laser Detection Using Local Mobile Network Within Cellular Network", filed on Mar. 1, 2006, the entirety of all of which are expressly incorporated herein by reference.

The present invention also claims priority from U.S. Provisional No. 61/728,546 to Pitt entitled "GeoNexus", filed Nov. 20, 2012, the entirety of which is also expressly incorporated herein by reference.

BACKGROUND OF THE INVENTION

1. Field of the Invention

This invention relates generally to network location services, and more particularly to a network service that maintains information sufficient to provide a near-real-time determination of proximity of affiliated mobile devices.

2. Background of Related Art

Today, every mobile cellular (e.g. CDMA, GSM, LTE, etc.) device is being located all of the time. As a mobile device moves, a cellular network does a signal hand-off between the mobile device's current controlling cell site sector and the mobile device's new cell site sector (the cell site sector into which the mobile device is moving). Signal handoff enables continuous and unbroken signaling to be maintained for a mobile device. Every cell site sector has an associated location. Hence, by inference, a mobile device's general location is known by a respective cell site.

As cellular infrastructure technology becomes deployed in greater density patterns (picocells, a.k.a., "femtocells"), a general location inferred from a cell site with which a mobile device is primarily communicating becomes higher fidelity.

Many cellular carriers are currently in the process of adding location probes to all deployed macro-cell sites. Location probes will enable carriers to maintain much more accurate location information for mobile devices located within range of these macro-cell sites.

SUMMARY

A method and apparatus for determining proximity of a plurality of associated mobile devices comprises, receiving a proximity request relating to a plurality of associated mobile devices, obtaining a list of identities for each of the plurality of associated mobile devices, and determining a bucket index, comprised of the places at which proximity is to be determined for each of the plurality of associated mobile devices.

In accordance with the principles of the present invention, a query is sent to a GeoNexus proximity evaluator function/mechanism to determine whether or not a plurality of other GeoNexus entities are located within a specified proximity resolution or specified proximity measurement, of a designated principal GeoNexus entity. Exemplary GeoNexus entities include: a mobile device, event location, attractor_point, repulsor_point, affinity_confluence, etc.

In accordance with the principles of the present invention, the GeoNexus proximity evaluator scans the plurality of GeoNexus entities indicated in the proximity request and separates the entities into discrete and ambiguous entities. For all discrete GeoNexus Entities, the GeoNexus proximity evaluator performs arithmetic computation of Proximity=TRUE|FALSE. For all ambiguous GeoNexus Entities, the GeoNexus proximity evaluator communicates with a GeoNexus node server that is responsible for maintaining a bucket in which the principal GeoNexus entity is located. When necessary, the GeoNexus node server sends requests to it's adjacent GeoNexus node servers (node servers responsible for buckets near the principal GeoNexus entity's bucket), to prompt those nodes to search for GeoNexus entities with a declared affinity that matches that of the ambiguous entity/entities included in the plurality of other GeoNexus entities.

A proximity request response includes a proximity determination for each of the plurality of associated mobile devices.

BRIEF DESCRIPTION OF THE DRAWINGS

Features and advantages of the present invention will become apparent to those skilled in the art from the following description with reference to the drawings, in which:

FIG. 5 shows an exemplary mobile device loc table including identifier, location (latitude and longitude), and optimization indices, in a node of the GeoNexus proximity detector network, in accordance with the principles of the present invention.

DETAILED DESCRIPTION OF ILLUSTRATIVE EMBODIMENTS

Figure 1:
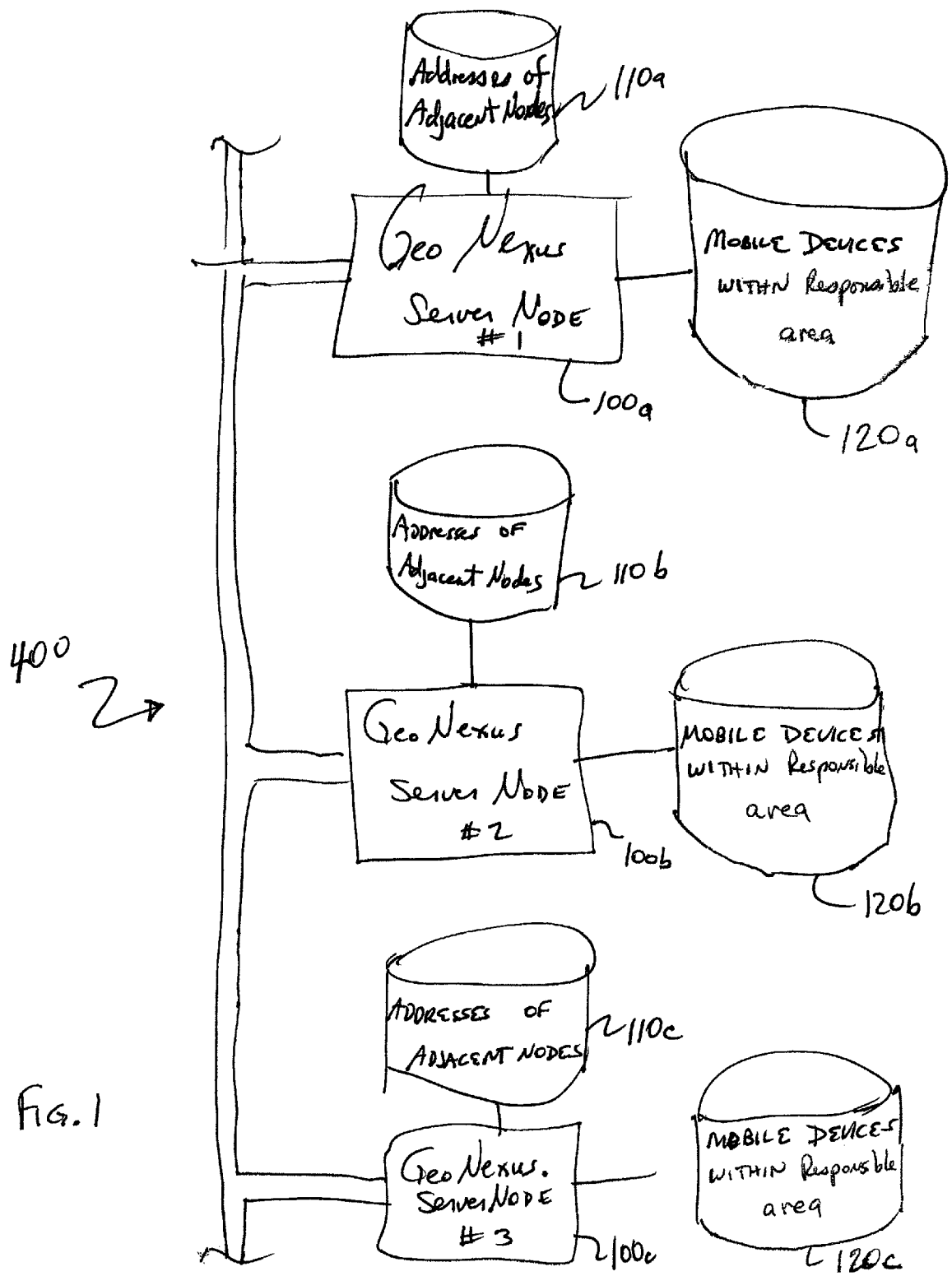
FIG. 1 shows a GeoNexus proximity detector network, in accordance with the principles of the present invention.

The present invention comprises a GeoNexus Proximity Detector Network (GPDN) for tracking mobile device location. In accordance with the principles of the present invention, all available location information pertaining to mobile devices, event locations, attractor points, repulsor points, affinity confluences, and all other discretely locatable entities, can and will be sent to the GeoNexus Proximity Detector Network (GPDN). The inventive GeoNexus Proximity Detector Network (GPDN) passively tracks everything in the network in a manner that can easily and quickly be consumed.

The GeoNexus Proximity Detector Network (GPDN) is not a single computer (no single computer could keep up with the amount of device location information continuously flowing in from so many different sources). Rather, the GeoNexus is an array of computing devices (i.e. servers), in which each node in the array is responsible for tabulating location information at a very specific level of granularity, for every mobile entity located within that node's responsible area of coverage.

To manage the enormous amount of information that is to barrage the GeoNexus every second of every day, the GeoNexus indexes each mobile device's identifier into a particular "bucket" (i.e. node) within each level of granularity (rather than maintaining location information as a double precision floating point value that represents latitude and longitude). The concept of the GeoNexus layers from lowest fidelity, or broadest expanse "location bucket" to highest fidelity, or smallest expanse "location bucket".

At a lowest fidelity (e.g., least level of granularity where each area of coverage is approximately 700 miles by 700 miles), any number of mobile devices may be logged within any particular bucket/node. In accordance with the principles of the present invention, the location at that level of fidelity of every device within that bucket/node is represented as the node's center latitude/longitude (a VERY coarse location).

The GeoNexus may contain five or six distinct levels of granularity/fidelity. Hence, if a grossly coarse location is not what a particular consumer/application wants or needs, that consumer/application can simply query the GeoNexus for location resolution at a higher fidelity.

Each node in the GeoNexus Proximity Detector Network (GPDN) reduces a mobile device's location (represented in decimal degrees of latitude and longitude) into four (4) (or five (5) or six (6)) layers of latitude and longitude indices. These four layers include:

| | |
|---|---|
| 1) Primary: tens of degrees | (~700 statute mile resolution) |
| 2) Secondary: Degrees | (~70 statute mile resolution) |
| 3) Tertiary: minutes | (~6000 foot resolution) |
| 4) Quaternary: seconds | (~100 foot resolution) |

At a fifth level of fidelity, a location associated with each node/bucket is approximately 10 feet. At a sixth level of fidelity, a location associated with each node/bucket is approximately one foot (likely overkill for most applications).

The fundamental approach of the GeoNexus is precisely the same regardless of the level of fidelity at which a mobile device location is recorded. Central to the invention is the use of buckets, each of which is associated with a particular location and fidelity. Buckets allow the GeoNexus Proximity Detection Network (GPDN) to perform very little actual computation. Instead, nodes of the GeoNexus proximity detector network simply push bits and bytes back and forth between buckets, and infer location information, and ultimately proximity, from each of the buckets and their "adjacent location" buckets.

However, even with the use of buckets, the complexity of the GeoNexus Proximity Detection Network (GPDN) is still very complex.

The GeoNexus Proximity Detector Network (GPDN) can be envisioned as a pyramid of computing devices/elements, wherein the pinnacle of the pyramid represents all mobile devices piled into one big bucket that covers the entire planet, and each lower layer of the pyramid contains more and more buckets to cover the same amount of area covered by the layer above. This pyramid of computing devices/elements is not uniformly distributed. Rather, this particular approach increases the density of computing devices/elements in direct proportion to the population density of a coverage area. For instance, it is possible that a single computation device/element can be used to cover almost all of the ocean area for the planet, with separate computation devices/elements handling the population centers of Hawaii, Samoa, Fiji, and other islands, scattered among the oceans of Terra Firma. Moreover, very (very) dense concentrations of computation devices/elements are required to cover immensely dense population centers, such as Los Angeles, New York (and it's many burroughs), Hong Kong, London, etc. In immensely dense population centers, it is very likely that operations, such as proximity evaluations, will have to be limited to only very high fidelity location layers (i.e. the lower levels) of the pyramid. To enable rapid proximity evaluations, it is required that every node have a known area of coverage and location fidelity, and that every node be able to communicate with all of its' adjacent nodes (as well of coverage areas of it's adjacent nodes).

In addition to the pyramid of computation devices/elements tabulating buckets of mobiles (from which location can be inferred), the nodes of the GeoNexus proximity detector network also maintains a fairly simple (but very large) data array, in which every mobile device is represented. A mobile entity data array records the precise latitude and longitude of a mobile device (if known) and records the indices within each layer of the pyramid the mobile device is bucketed. This MOBILE_ENTITY array is quintessential to optimizing location updates and targeted query speeds. A location update occurs when a mobile device's OLD location is erased and the mobile device's NEW location is recorded.

In accordance with the principles of the present invention, a location update is performed by for a particular mobile device by:

1. using the MOBILE_ENTITY array to directly access old buckets in which the mobile device is recorded for removal;
2. determining new bucket indices within each and every layer of fidelity;
3. saving the mobile device's ID in the new buckets for each layer of fidelity; and
4. saving the new bucket indices in the MOBILE_ENTITY array.

When a location request for a particular mobile device is received (targeted location query) on the GeoNexus Proximity Detector Network (GPDN), a relevant GeoNexus proximity detector network node either directly looks up a precise location saved for the mobile device in the MOBILE_ENTITY array, or extracts a location associated with the highest fidelity node/bucket and returns that value (this is the easy part).

Huge dividends are paid as more and more applications begin to take advantage of proximity, as determined by the GeoNexus Proximity Detector Network (GPDN), i.e., proximity to persons, places, things, and/or areas.

For instance, if an application wants to evaluate proximity of a group of persons (as identified by the person's preferred mobile device) to a particular place (rather a form of geofencing), the application need only compute the bucket index of the desired place, directly query the node responsible for that bucket, and ask the node to query its sibling (adjacent) nodes. The proximity request might require a small sequence of queries if the geofence has an irregular outline. However, even a small sequence of queries can be evaluated very quickly. A query response to a proximity request will either be "NO" (i.e. no proximity detected), or "YES" (i.e. proximity detected) and include a bucket index.

The architecture of the GeoNexus proximity detector network easily supports small groups, such as those within a "trusted circle". Moreover, GeoNexus can support much larger and more ambiguous groups, such as affinity groups derived from Facebook's many forms of "likes", "dislikes", and "friends" groups. Such groups may contain as many as 1000 s or 10 s of thousands of members and membership can change hourly. That is the Holy Grail of location determination and proximity detection as enabled by the GeoNexus proximity detector network, in accordance with the principles of the present invention.

As an optimization, rather than searching through various buckets that are near to one another, a determination of proximity "state" between a known or discrete GeoNexus entity and a plurality of other discrete GeoNexus entities can easily be accomplished using simple arithmetic based on bucket indices associated with each mobile entity.

In particular, using the following layers of fidelity: primary (i.e. tens of degrees, ~700 statute mile resolution), secondary (i.e. degrees, ~70 statute mile resolution), tertiary (i.e. minutes, ~6000 foot resolution), quaternary (i.e. seconds, ~100 foot resolution), quinary (i.e. 10 ths of seconds, ~10 foot resolution) and senary (i.e. 100 ths of seconds, ~1 foot resolution), the inventive method/apparatus need only:

A) choose a fidelity/resolution

B) compute an index span for the fidelity/resolution that represents the desired proximity C) compute the hypotenuse between a pair of mobile devices' X and Y values, using the following computation:

$$\text{square\_root}(((\text{mobile\_1}.X-\text{mobile\_2}.X)*(\text{mobile\_1}.X-\text{mobile\_2}.X))+((\text{mobile\_1}.Y-\text{mobile\_2}.Y)*(\text{mobile\_1}.Y-\text{mobile\_2}.Y)))$$

D) compare the computed hypotenuse to the representative index span

Square root functions are very expensive, computationally. Therefore, an obvious optimization would be to square the computed index span (i.e. index_span*index_span) and then compare the squared index_span to the following computation:

$$((\text{mobile\_1}.X-\text{mobile\_2}.X)*(\text{mobile\_1}.X-\text{mobile\_2}.X))+((\text{mobile\_1}.Y-\text{mobile\_2}.Y)*(\text{mobile\_1}.Y-\text{mobile\_2}.Y))$$

This method of optimization eliminates the use of a square_ root function.

In accordance with the principles of the present invention, the reference index_span can be squared once per proximity evaluation, regardless of how many devices are being evaluated. This procedure eliminates 'N' square root operations for an entire evaluation (where 'N' is equal to the number of mobile devices being evaluated). Even if the value of 'N' is only 1, squaring the reference index_span and comparing the square to the above-stated computation is still an optimization, as computing the square of a value (i.e. index_span*index_span) is always a less costly operation than a square_root operation.

For example, when the GeoNexus Proximity Detector Network (GPDN) receives a request to evaluate whether or not two persons, e.g. person A and person B (as determined by the persons' respective mobile devices), are located within 700 feet of one another, the GeoNexus Proximity Detector Network (GPDN) iterates from the top layer (lowest fidelity) down toward the lowest layer (highest fidelity), and compares the requested proximity resolution against the fidelity layer's one-node resolution. When the requested proximity resolution is greater than or equal to the fidelity layer's one-node resolution, the method/apparatus can stop the search and compute the appropriate index_span.

In this particular, example 700 ft is less than 700 mi for the primary layer, so the method/apparatus continues; 700 ft is less than 70 mi for the secondary layer, so the method/apparatus continues; 700 ft is less than 6000 ft for the tertiary layer, so the method/apparatus continues. Finally, 700 ft is greater than or equal to 100 ft for the quaternary layer, so the method/apparatus stops and computes the index_span.

Index_span computation is a simple modulo of the requested proximity resolution, by the fidelity layer's one-node resolution. In this example, 700 ft, modulo the quaternary layer's one-node resolution of 100 ft, results in an index_span of 7 and a remainder of 0. For the purposes of this invention, if a remainder of a modulo function is 0 through 4, the method/apparatus leaves the index_span unaltered. Rather, if a remainder of a modulo function is 5 through 9, the index_span is increased by a value of 1. In this example, the remainder of the modulo function is zero, so the index_span remains at 7 and the reference_value is computed as 7*7=49. Thus, the proximity evaluation for person A and person B becomes:

$$\text{Proximity}=(\text{Reference\_Value}\geq((\text{person}A.\text{Quaternary}.X-\text{person}B.\text{Quaternary}.X)^2+(\text{person}A.\text{Quaternary}.Y-\text{person}B.\text{Quaternary}.Y)^2))$$

The Boolean function, greater than or equal to ("≥"), embedded in the proximity evaluation reduces the entirety of the equation on the right side of the equal sign ('=') to TRUE or FALSE. Thus, value "Proximity" represents the desired evaluation. If the reference_distance is greater than or equal to the distance between person A and person B, then person A and person B are, indeed, within the requested proximity resolution, and the value of Proximity is TRUE. Conversely, if the reference_distance is less than the distance between person A and person B, then person A and person B are not within the requested proximity resolution, and the value of Proximity is FALSE.

With regard to proximity detection, the pyramid of computation elements, each of which maintains only a subset of its assigned fidelity layer's "buckets", becomes especially useful when detecting proximity between a known entity (e.g. a known mobile device) and an unknown collection of entities. For instance, an unknown collection of entities could be derived in near-realtime from affinity groupings provided by any one of a growing number of social media collectives. When evaluating a "known" versus a potentially vast array of social media derived "unknowns", an optimal approach is to scan everyone within a designated proximity resolution while looking for a desired social affinity, and then report on who or what is found.

An AFFINITY-VECTOR is described in U.S. Application No. ??? to Pitt, et al. entitled "N-Dimensional Affinity Confluencer" (N-DAC), the entirety of which is included herein by reference.

In accordance with the principles of the present invention, whenever a GeoNexus bucket is updated, an affinity vector is computed based on the social affinities of the mobile devices within that bucket. Affinity-Vectors that reach a pre-designated amplitude could result in a new instance of a particular class of GeoNexus "object", called "AFFINITY-CONFLUENCE" (i.e. mobile device, event, attractor_point, repulsor_point, etc., represented within the GeoNexus Proximity Detector Network (GPDN)). When AFFINITY-VECTORs are computed and AFFINITY-CONFLUENCEs are included as discrete entities in GeoNexus' layers, the ability to create useful proximity based notifications is greatly optimized because a proximity query can be designated, versus a CLASS of AFFINITY-CONFLUENCE, with a simple descriptor, such as a Uniform Resource Name (URN) to designate a particular affinity base for the confluence. In accordance with the principals of the present invention every affinity confluence can be designated by a mobile subscriber to be either ATTRACTIVE or REPULSIVE so that appropriate notification(s) can be delivered to the mobile subscriber's mobile device.

FIG. 1 shows a GeoNexus proximity detector network, in accordance with the principles of the present invention.

In particular, as shown in FIG. 1, a plurality of GeoNexus server nodes 100a, 100b, 100c etc. (collectively referenced herein as 100) comprise a GeoNexus proximity detector network 400. Ideally the GeoNexus proximity detector network 400 includes enough GeoNexus server nodes 100 to have one responsible for every location on earth.

Each GeoNexus server node 100a, 100b, 100c has access to a respective Addresses of Adjacent Nodes database 110a, 110b, 110c, which stores addresses, or other contact information for that GeoNexus server node 100, to enable the GeoNexus server node to be aware of and be able to query all adjacent GeoNexus server nodes 100.

Each GeoNexus server node 100a, 100b, 100c also has access to a respective Mobile Devices Within Responsible Area database 120a, 120b, 120c, which maintains proximity buckets for that node's respective responsible area.

Any mobile device, application server, etc., may request proximity services from the GeoNexus Proximity Detector Network (GPSN). Such proximity request is routed to one server node of the GeoNexus Proximity Detector Network (GPSN) that is responsible for the place at which proximity is to be measured. For instance, a mobile device may send a request to the GeoNexus Proximity Detector Network (GPDN) to determine which of their 'friends' in a social media application (as determined by registered mobile devices) are currently proximate to a current location of the requesting mobile device. To make such a request, a single proximity request need be launched to the one GeoNexus proximity detector server node responsible for the requesting mobile device is currently located in. The single targeted GeoNexus server node 100 of the GeoNexus Proximity Detector Network (GPSN) 400 then takes it from there by querying only its adjacent nodes, to determine which of the requesting mobile device's 'friends' are currently located within that adjacent GeoNexus server node's area of responsibility (as measured by the inclusion of the ID (e.g., Mobile ID number) of any 'friends' mobile devices within any bucket of the node's Mobile Devices Within Responsible Area database 120).

Figure 2:
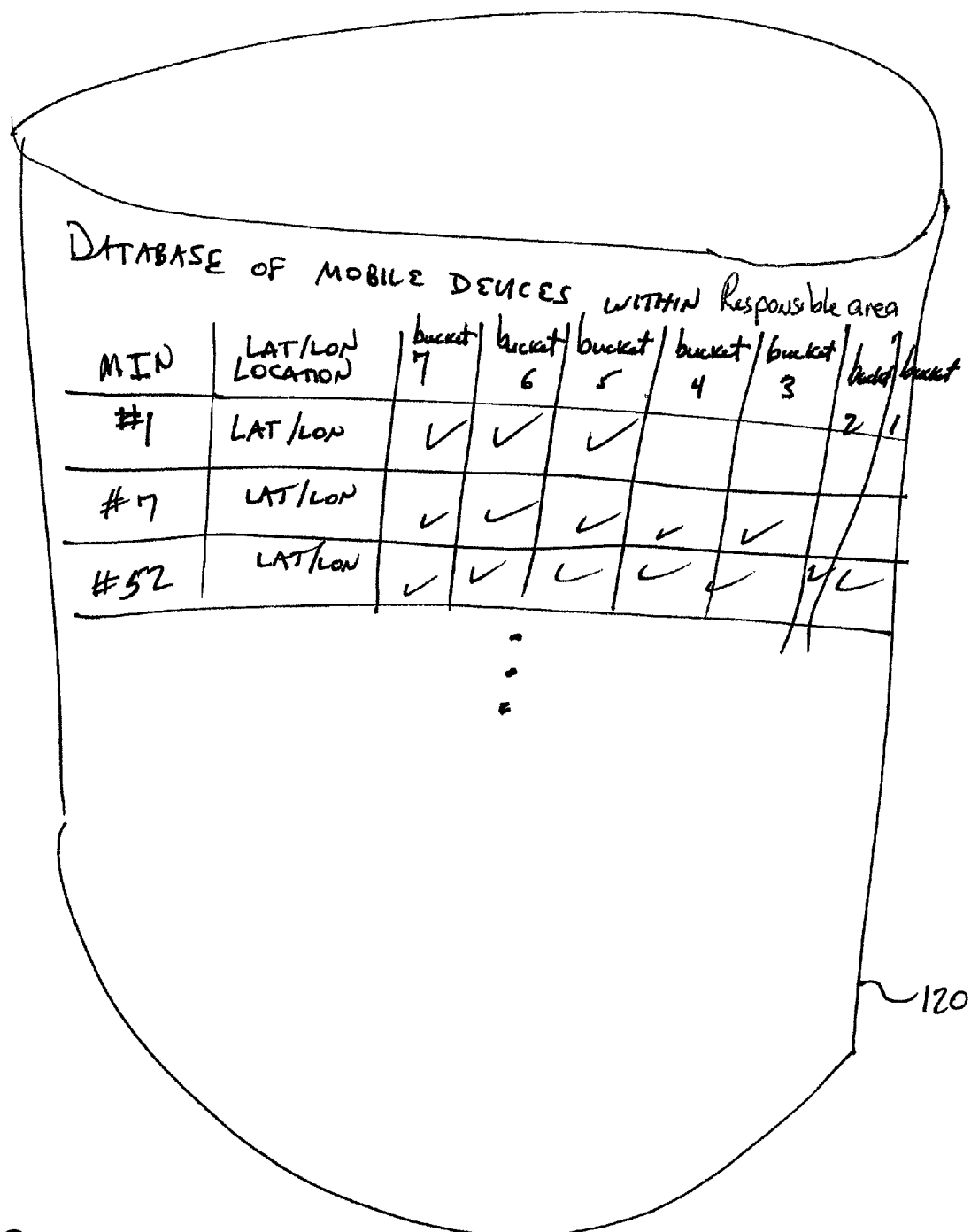
FIG. 2 depicts an exemplary GeoNexus database of mobile devices within responsible area of the relevant GeoNexus node server, in accordance with the principles of the present invention.

FIG. 2 depicts an exemplary GeoNexus database of mobile devices within a responsible area of a GeoNexus node server, in accordance with the principles of the present invention.

In particular, as shown in FIG. 2, a database of mobile devices within responsible area includes an identity of any/all mobile devices currently located within the physical area for which the relevant GeoNexus server node 100 is responsible for maintaining. A unique ID number (e.g., mobile identification number (MIN)) is stored for each mobile device currently located in the responsible area, as is location information already known, and a resolution to which that location information ascribes. For many devices, a location may be as simple as "within range of the cell station antenna", which may fit into, e.g., bucket 5 or 6.

Figure 3A:
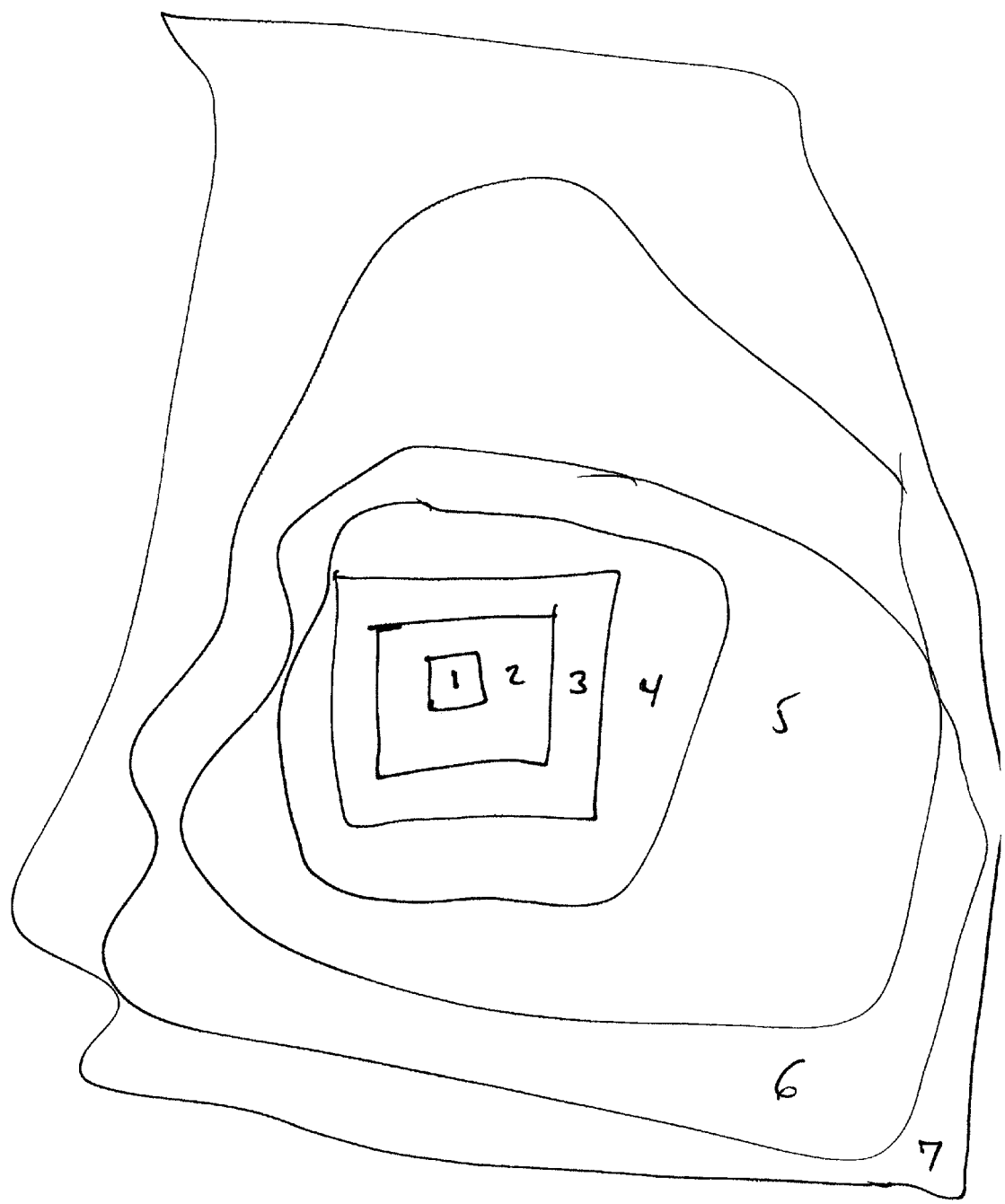
FIG. 3A depicts an exemplary pyramid of buckets for devices within a given responsible area, in accordance with the principles of the present invention.

FIG. 3A depicts an exemplary pyramid of buckets for devices within a given responsible area, in accordance with the principles of the present invention.

In particular, as shown in FIG. 3A, a pyramid of buckets 1, 2, 3, 4, 5, 6, 7 of varying resolution of location data is depicted; bucket 1 being of the highest resolution (e.g., location is known within 10 feet), to bucket 5 (e.g., being within range of the relevant base station), to bucket 7 which may be, e.g., the entire state (or larger).

Figure 3B:
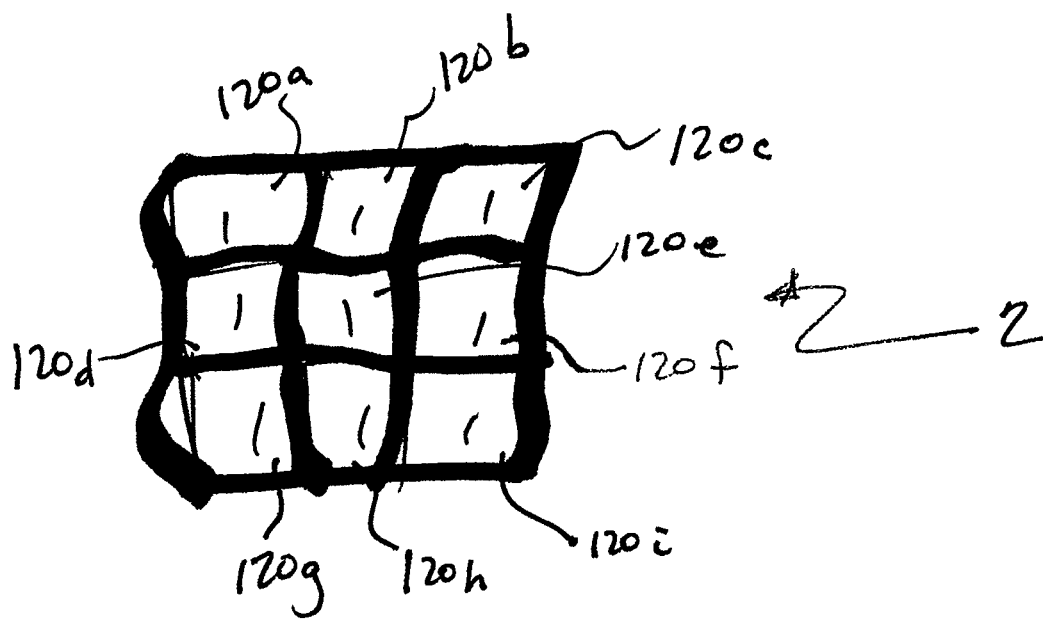
FIG. 3B depicts a plurality of GeoNexus proximity detector node servers adjacent a central GeoNexus proximity detector node surrounded thereby, in accordance with the principles of the present invention.

FIG. 3B depicts a plurality of GeoNexus proximity detector node servers 120a, 120b, 120c, 120d, 120f, 120g, 120h, 120i adjacent a central GeoNexus proximity detector node 120e surrounded thereby, in accordance with the principles of the present invention.

Figure 4:
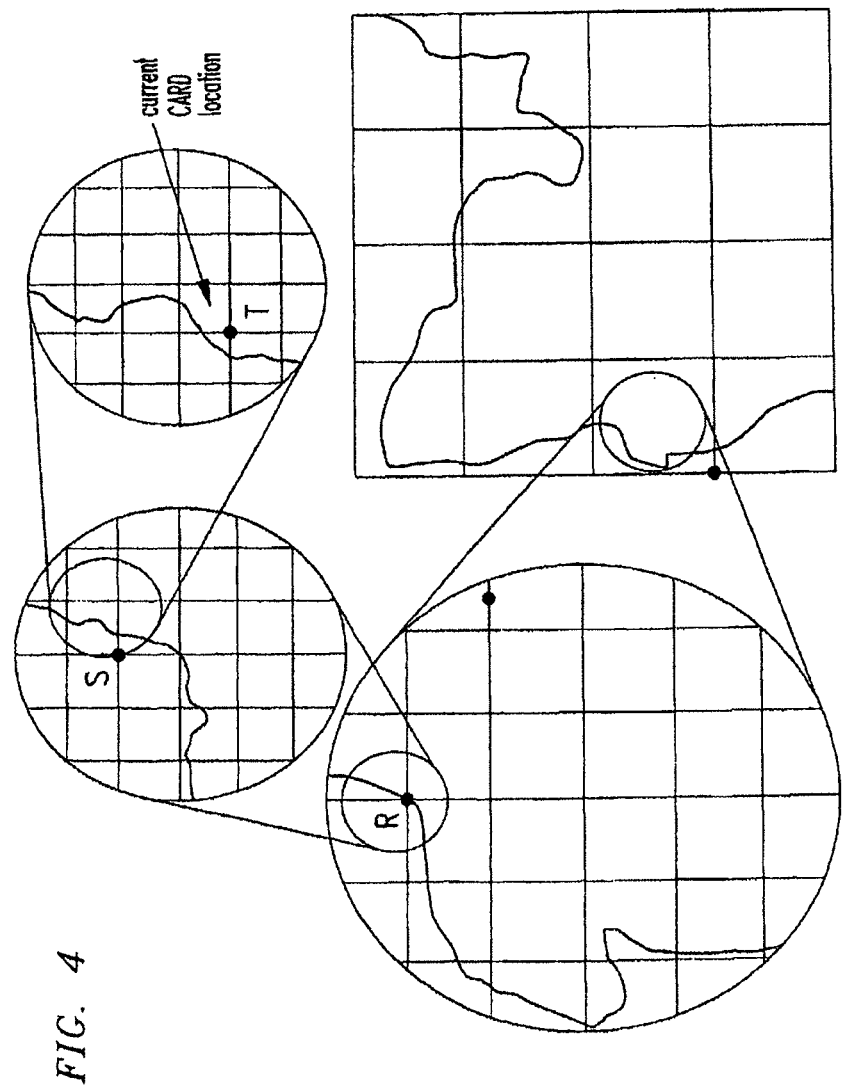
FIG. 4 shows figurative coverage of the Earth's surface with successively finer grained gridlines, in accordance with the principles of the present invention.

FIG. 4 shows figurative coverage of the Earth's surface with successively finer grained gridlines, in accordance with the principles of the present invention.

In particular, as shown in FIG. 4, seconds of latitude and longitude yield a grid whose vertices are approximately 100 feet apart at the equator and somewhat closer together the farther away from the equator (North or South) the mobile device is located. Should the need arise to attain even finer granularity than seconds, a fifth (Quinary) and even sixth (Senary) layer can be added to represent 10 ths of seconds (~10 feet) and 100 ths of seconds (~12 inches).

FIG. 5 shows an exemplary mobile device loc table including identifier, location (latitude and longitude), and optimization indices, in a node of the GeoNexus proximity detector network, in accordance with the principles of the present invention.

The mobile device GeoNexus gateway node saves a given mobile device's identifier, location (latitude and longitude), and optimization indices in a mobile device loc table as exemplified in FIG. 5.

The Lat and Lon values are normalized to be decimal degrees in the range −90.0 through +90.0 for Latitude and −180.0 through +180.0 for Longitude. The indices are computed as follows:

$$PrimaryX=int(round((Lon/10.0)-0.5))$$

$$PrimaryY=int(round((Lat/10.0)-0.5))$$

$$SecondaryX=int(truncate(Lon-(PrimaryX*10.0)))$$

$$SecondaryY=int(truncate(Lat-(PrimaryY*10.0)))$$

$$TertiaryX=int(truncate((Lon-((PrimaryX*10.0)+SecondaryX))*60.0))$$

$$TertiaryY=int(truncate((Lat-((PrimaryY*10.0)+SecondaryY))*60.0))$$

$$QuaternaryX=int(truncate((Lon-((PrimaryX*10.0)+SecondaryX+(TertiaryX/60.0)))*3600.0))$$

$$QuaternaryY=int(truncate((Lat-((PrimaryY*10.0)+SecondaryY+(TertiaryY/60.0)))*3600.0))$$

These equations presume that the round( )function always rounds an "n.5" value up, so that 0.5 becomes 1.0, 2.5 becomes 3.0, −3.5 becomes −3.0, etc. Some adjustments might be necessary to accommodate specific hardware architectures, operating systems, and compilers.

The intent, though, is to compute an index based on the lower left corner of a square in which a mobile device is located. The primary square (Q) is a 10 degree by 10 degree square. The secondary square (R) is a one degree by one degree square located within the primary. The tertiary square (S) is a one minute by one minute square located within the secondary. The quaternary square (T) is a one second by one second square located within the tertiary.

These computations produce values in the following ranges:

−18 <= PrimaryX <= 18    −9 <= PrimaryY <= 9
0 <= SecondaryX <= 9     0 <= SecondaryY <= 9
0 <= TertiaryX <= 60     0 <= TertiaryY <= 60
0 <= QuaternaryX <= 60   0 <= QuaternaryY <= 60

Figure 6:
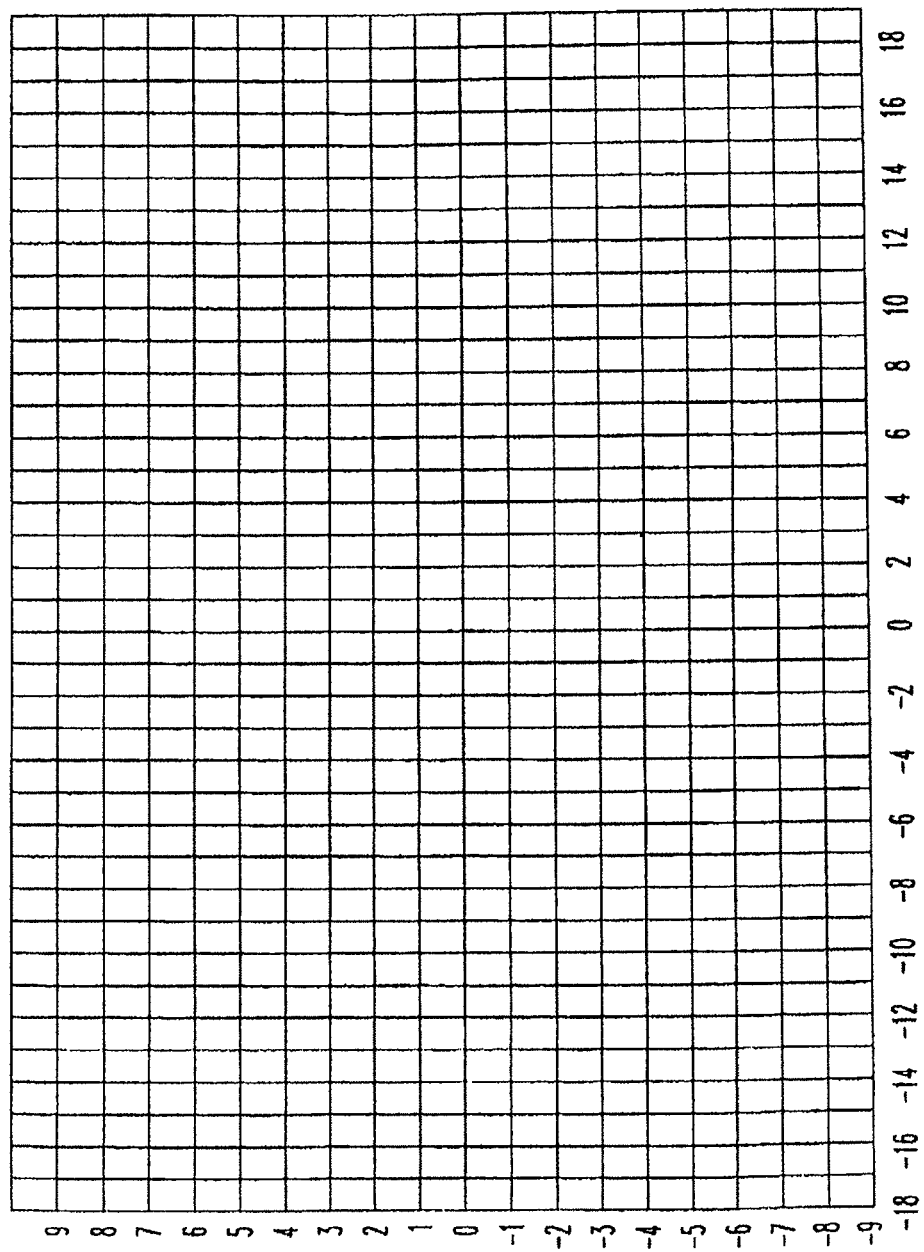
FIG. 6 shows a matrix for primary indices for a mobile device GeoNexus proximity detector gateway node that maintains a collection of matrices in temporary memory such as Random Access Memory (RAM), i.e., not in a relational database, in accordance with the principles of the present invention.

FIG. 6 shows a matrix for primary indices for a mobile device GeoNexus proximity detector gateway node that maintains a collection of matrices in temporary memory such as Random Access Memory (RAM), i.e., not in a relational database, in accordance with the principles of the present invention.

A collection of matrices in accordance with the principles of the present invention, preferably always includes a matrix for the primary indices, as shown in FIG. 6.

The primary matrix is preferably accompanied by a PrimaryCount that indicates how many mobile devices are present.

The primary matrix is also preferably accompanied by an array or list of primary matrix elements in which mobile devices can be found (list will be empty if PrimaryCount is zero).

Each element in the 36×18 primary matrix preferably contains: (1) a count of how many mobile devices are present in that particular 10 deg×10 deg area; and (2) a reference to a secondary matrix (reference will be NULL if count is zero).

Secondary (10×10 matrix), tertiary (60×60), and quaternary (60×60) matrices will be allocated, maintained, and eliminated, as needed, to manage memory use in the mobile device GeoNexus proximity detector gateway.

Each secondary matrix is preferably accompanied by a SecondaryCount indicating how many mobile devices are present in that 10 deg×10 deg area.

Each secondary matrix is also preferably accompanied by an array or list of secondary matrix elements in which mobile devices can be found (the list will be empty if SecondaryCount is zero).

Each element in a 10×10 secondary matrix preferably contains: (1) a count of how many mobile devices are present in that particular 1 deg×1 deg area; and (2) a reference to a tertiary matrix (reference will be NULL if count is zero).

Each tertiary matrix is preferably accompanied by a TertiaryCount, indicating how many mobile devices are present in that 1 deg×1 deg area.

Each tertiary matrix is preferably accompanied by an array or list of tertiary matrix elements in which mobile devices can be found (list will be empty if TertiaryCount is zero).

Each element in a 60×60 tertiary matrix preferably contains: (1) a count of how many mobile devices are present in that particular 1 minute×1 minute area; and (2) a reference to a quaternary matrix (reference will be NULL if count is zero).

Each quaternary matrix is preferably accompanied by a QuaternaryCount indicating how many mobile devices are present in that 1 min×1 min area.

Each quaternary matrix is preferably accompanied by an array or list of quaternary elements in which mobile devices can be found (the list will be empty if QuaternaryCount is zero).

Each element in a 60×60 quaternary matrix preferably contains: (1) a count of how many mobile devices are present in that particular 1 second×1 second area; and (2) an array or list of mobile device identifiers that are present in the 1 sec×1 sec area (the list will be empty if count is zero).

Proximity can be a configured reference value defined in terms of hundreds of feet, thousands of feet, tens of miles, hundreds of miles, etc. Regardless of the defined distance for 'proximate', the mobile device GeoNexus proximity detector network is able to rapidly identify which mobile devices meet the criteria. The broader the proximity value is defined, though, the longer it will generally take the GeoNexus proximity detector network to send required notifications, due to latencies imposed by the carrier's core network.

Consider the following use case of a GeoNexus Proximity Detector network, in accordance with the principles of the present invention, referred to herein as "Vigilant-Sentinel".

In particular, presume that for a given mobile user, "My Car", is a recognized and tracked mobile device via its onboard telematics equipment, and that, "My iPhone", is also a recognized and traced mobile device.

Early one morning (9 Nov. 2012) both "My Car" and "My iPhone" are recorded within the same 100 foot by 100 foot GeoNexus bucket ($4^{th}$ layer of fidelity).

At 7:10 am the Vigilant-Sentinel application to which the exemplary user subscribes detects that "My Car" is in motion and quickly checks to see if "My iPhone" is still within the same $4^{th}$ layer bucket as "My Car's" newly computed location.

VIGILANT-SENTINEL detects that my "My iPhone" is not within the same $4^{th}$ layer node as "My Car", but is still within the $4^{th}$ layer node around a "My House". The Vigilant-Sentinel application queries "My iPhone's" $5^{th}$ layer node and detects that "My iPhone" has moved from one $5^{th}$ layer node to another within the last 10 minutes. The Vigilant-Sentinel application then accesses identities of the user's trusted circle; looks for associated mobile device identifiers such as "My Wife", "My Child", "My Daughter", "My Mother-In-Law", "My Relative", etc., and checks to see whether any of those associated mobile devices are within the same $4^{th}$ layer node as "My Car". The Vigilant-Sentinel application utilizes the GeoNexus proximity detector network to provide quick and appropriate detection of proximity between "My Car" and "My Daughter's" mobile device. The Vigilant-Sentinel queues up a secondary, tertiary, etc., check for proximity, e.g., 30 seconds in the future, 60 seconds in the future, etc. After verifying continued proximity between "My Car" and "My Daughter's" mobile device, the Vigilant-Sentinel application making use of proximity detection via the GeoNexus proximity detector network, and makes the probable determination that "My Daughter" has borrowed "My Car". The Vigiland-Sentinel may then notify the owner of "My Car" with an appropriate text message informing the user that "My Daughter" has borrowed "My Car".

Other use cases are of course possible and envisioned, e.g., the GeoNexus proximity detector network can be used to check for potential auto theft (e.g., when "My Car" is moving and none of the devices within the trusted circle of users are moving along with "My Car"). If the Vigilant-Sentinel concludes that auto theft is likely, it immediately notifies the registered user device via a more timely mechanism (e.g., interactive voice response (IVR)). If the vehicle associated with the "My Car" mobile device is registered as having a theft service, such as LoJack™, installed, the relevant user device may be prompted to authorize the Vigilant-Sentinel application to automatically enable the theft-prevention device (e.g., LoJack device) and notify the relevant authorities, to expedite recovery of the vehicle.

While the invention has been described with reference to the exemplary embodiments thereof, those skilled in the art will be able to make various modifications to the described embodiments of the invention without departing from the true spirit and scope of the invention.

What is claimed is:

1. A method of determining proximity of a plurality of associated mobile devices, comprising:
   receiving a proximity request relating to a plurality of associated mobile devices;
   obtaining a list of identities of said plurality of associated mobile devices for which proximity is to be determined;
   determining a bucket index of a place to which proximity is to be determined for each of said plurality of associated mobile devices;
   querying a target geonexus node server associated with said determined bucket index requesting which of said plurality of associated mobile devices are currently located within an area of responsibility of said target geonexus node server;
   initiating a query to each geonexus node server responsible for an area adjacent to said target geonexus node server, requesting which of said plurality of associated mobile devices are currently located within the respective adjacent area of responsibility; and
   responding to said proximity request with a proximity determination for each of said plurality of associated mobile devices.

2. The method of determining proximity of a plurality of associated mobile devices according to claim 1, wherein:
   said target geonexus node server initiates said query to each geonexus node server adjacent thereto.

3. The method of determining proximity of a plurality of associated mobile devices according to claim 1, wherein:
   said plurality of associated mobile devices comprise those predesignated as being within a group of trusted mobile devices.

4. The method of determining proximity of a plurality of associated mobile devices according to claim 1, wherein:
   said plurality of associated mobile devices comprise those as having associated with a given social media posting.

5. The method of determining proximity of a plurality of associated mobile devices according to claim 1, wherein:
   said plurality of associated mobile devices comprise those as being within a given predesignated grouping of devices within a social media application.

6. The method of determining proximity of a plurality of associated mobile devices according to claim 1, wherein:
   said plurality of associated mobile devices for which said proximity is determined pursuant to said proximity request is at least 1000 mobile devices.

7. The method of determining proximity of a plurality of associated mobile devices according to claim 1, wherein:
   said plurality of associated mobile devices for which said proximity is determined pursuant to said proximity request is at least 10,000 mobile devices.

8. Apparatus for determining proximity of a plurality of associated mobile devices, comprising:
   a geonexus server to receive a proximity request relating to a plurality of associated mobile devices including a list of identities of said plurality of associated mobile devices for which proximity is to be determined, said GeoNexus server comprising:
      a physical network database to maintain a bucket index of a place to which proximity is to be determined for each of said plurality of associated mobile devices,
      a target geonexus node server associated with said bucket index to provide an identification of which of said plurality of associated mobile devices are currently located within an area of responsibility of said target geonexus node server;
      an adjacent target geonexus node server responsible for an area adjacent to said target geonexus node server to provide an identification of which of said plurality of associated mobile devices are currently located within the respective adjacent area of responsibility; and
      a transmitter to respond to said received proximity request with a proximity determination for each of said plurality of associated mobile devices.

9. The apparatus for determining proximity of a plurality of associated mobile devices according to claim 8, wherein:
   said target geonexus node server initiates said query to each geonexus node adjacent thereto.

10. The apparatus for determining proximity of a plurality of associated mobile devices according to claim 8, wherein:
    said plurality of associated mobile devices comprise those predesignated as being within a group of trusted mobile devices.

11. The apparatus for determining proximity of a plurality of associated mobile devices according to claim 8, wherein:
    said plurality of associated mobile devices comprise those as having associated with a given social media posting.

12. The apparatus for determining proximity of a plurality of associated mobile devices according to claim 8, wherein:
    said plurality of associated mobile devices comprise those as being within a given predesignated grouping of devices within a social media application.

13. The apparatus for determining proximity of a plurality of associated mobile devices according to claim 8, wherein:
    said plurality of associated mobile devices for which said proximity is determined pursuant to said proximity request is at least 1000 mobile devices.

14. The apparatus for determining proximity of a plurality of associated mobile devices according to claim 8, wherein:
    said plurality of associated mobile devices for which said proximity is determined pursuant to said proximity request is at least 10,000 mobile devices.

* * * * *